(12) United States Patent
Wei et al.

(10) Patent No.: US 12,116,459 B2
(45) Date of Patent: Oct. 15, 2024

(54) THERMALLY INITIATED ACID CATALYZED REACTION BETWEEN SILYL HYDRIDE AND SILYL ETHER AND/OR SILANOL

(71) Applicant: Dow Silicones Corporation, Midland, MI (US)

(72) Inventors: Yanhu Wei, Midland, MI (US); Steven Swier, Midland, MI (US); Zhenbin Niu, Midland, MI (US); Nanguo Liu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 477 days.

(21) Appl. No.: 17/598,338

(22) PCT Filed: Jun. 2, 2020

(86) PCT No.: PCT/US2020/035639
§ 371 (c)(1),
(2) Date: Sep. 27, 2021

(87) PCT Pub. No.: WO2020/247332
PCT Pub. Date: Dec. 10, 2020

(65) Prior Publication Data
US 2022/0185965 A1 Jun. 16, 2022

Related U.S. Application Data

(60) Provisional application No. 62/856,776, filed on Jun. 4, 2019.

(51) Int. Cl.
| | | |
|---|---|---|
| C08G 77/08 | (2006.01) | |
| C08G 77/00 | (2006.01) | |
| C08G 77/12 | (2006.01) | |
| C08G 77/16 | (2006.01) | |
| C08G 77/18 | (2006.01) | |
| C08K 5/18 | (2006.01) | |
| C08L 83/04 | (2006.01) | |
| C09D 183/04 | (2006.01) | |

(52) U.S. Cl.
CPC ............ *C08G 77/08* (2013.01); *C08G 77/12* (2013.01); *C08G 77/16* (2013.01); *C08G 77/18* (2013.01); *C08G 77/70* (2013.01); *C08K 5/18* (2013.01); *C08L 83/04* (2013.01); *C09D 183/04* (2013.01)

(58) Field of Classification Search
CPC ........................................................ C08G 77/08
See application file for complete search history.

(56) References Cited

U.S. PATENT DOCUMENTS

| | | |
|---|---|---|
| 4,254,271 A | 3/1981 | Finke et al. |
| 5,721,290 A | 2/1998 | Eckberg et al. |
| 5,866,261 A | 2/1999 | Kerr et al. |
| 6,218,445 B1 | 4/2001 | Priou et al. |
| 6,548,568 B1 | 4/2003 | Pinto et al. |
| 6,777,512 B1 | 8/2004 | Sonnenschein et al. |
| 7,064,173 B2 | 6/2006 | Rubinsztajn et al. |
| 7,906,605 B2 | 3/2011 | Cray et al. |
| 8,048,819 B2 | 11/2011 | Rubinsztajn et al. |
| 8,470,899 B2 | 6/2013 | Maliverney |
| 8,629,222 B2 | 1/2014 | Takizawa et al. |
| 8,968,868 B2 | 3/2015 | Yang et al. |
| 9,006,336 B2 | 4/2015 | Yang et al. |
| 9,006,357 B2 | 4/2015 | Yang et al. |
| 9,035,008 B2 | 5/2015 | Yang et al. |
| 9,624,154 B2 | 4/2017 | Blair |
| 9,856,194 B2 | 1/2018 | Fontaine et al. |
| 10,259,908 B2 | 4/2019 | Arkles et al. |
| 2003/0139287 A1 | 7/2003 | Deforth et al. |
| 2005/0136269 A1 | 6/2005 | Doehler et al. |
| 2006/0211836 A1 | 9/2006 | Rubinsztajn et al. |
| 2006/0241271 A1 | 10/2006 | Rubinsztajn et al. |
| 2006/0280957 A1 | 12/2006 | Lee et al. |
| 2006/0293172 A1 | 12/2006 | Rubinsztajn et al. |
| 2008/0281469 A1 | 11/2008 | Choi et al. |
| 2009/0192282 A1 | 7/2009 | Janvikul et al. |
| 2010/0144960 A1 | 6/2010 | Cray et al. |

(Continued)

FOREIGN PATENT DOCUMENTS

| | | |
|---|---|---|
| CA | 2894146 A1 | 6/2014 |
| CN | 1989178 A | 6/2007 |

(Continued)

OTHER PUBLICATIONS

Kamino, et. al., "Siloxane-Triarylamine Hybrids: Discrete Room Temperature Liquid Triarylamines via the Piers-Rubinsztajn Reaction" Organic Letters, 2011, pp. 154-157, vol. 13, No. 1.
Voss, et. al. "Frustrated Lewis Pair Behavior of Intermolecular Amine/B(C6F5)3 Pairs" Organometallics, 2012, pp. 2367-2378, vol. 31.
Stephan, et. al., "Frustrated Lewis Pairs: Metal-free Hydrogen Activation and More" Angew. Chem. Int. Ed., 2010, pp. 46-76, vol. 49.
Asenjo-Sanz et al., "Zwitterionic Polymerization of Glycidyl Monomers to Cyclic Polyethers with B(C6F5)3" The Royal Society of Chemistry, 2012 pp. 1-5.
Chakraborty et al., "Catalytic Ring-Opening Polymerization of Propylene Oxide by Organoborance and Aluminum Lewis Acids" Macromolecules, 2003, pp. 5470-5481.
Chen et al., "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, pp. 844-856, vol. 52.

(Continued)

*Primary Examiner* — Marc S Zimmer
(74) *Attorney, Agent, or Firm* — Steve W. Mork; Catherine U. Brown

(57) ABSTRACT

A composition contains a mixture of silyl hydride, a silanols and/or silyl ether, a Lewis acid catalyst and an amine having the following formula: $R^1R^2R^3N$; where the nitrogen is not a member of an N=C—N linkage and each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon.

20 Claims, No Drawings

(56) References Cited

U.S. PATENT DOCUMENTS

| | | |
|---|---|---|
| 2013/0234070 A1 | 9/2013 | Mowrer |
| 2015/0141570 A1 | 5/2015 | Buckanin et al. |
| 2015/0376481 A1 | 12/2015 | Larson et al. |
| 2016/0289388 A1 | 10/2016 | Fu et al. |
| 2016/0319081 A1 | 11/2016 | Kanta et al. |
| 2019/0031932 A1 | 1/2019 | Zhang et al. |

FOREIGN PATENT DOCUMENTS

| | | | |
|---|---|---|---|
| CN | 104877310 A | 9/2015 | |
| FR | 2824835 A1 | 11/2002 | |
| WO | 2008125911 A2 | 10/2008 | |
| WO | 2011045605 A1 | 4/2011 | |
| WO | 2012060449 A1 | 5/2012 | |
| WO | WO-2013106193 A1 * | 7/2013 | ............ B05D 3/007 |
| WO | 2013142956 A1 | 10/2013 | |
| WO | 2016097734 A1 | 6/2016 | |
| WO | 2016168914 A1 | 10/2016 | |
| WO | 2017100904 A1 | 6/2017 | |
| WO | 2019070866 A1 | 4/2019 | |
| WO | 2020247337 A1 | 12/2020 | |

OTHER PUBLICATIONS

Chojnowski et al., "Mechanism of the B(C6F5)3-Catalyzed Reaction of silyl Hydrides with Alkoxysilanes. Kinetic and Spectroscopic Studies" Organometallics, 2005, vol. 24, pp. 6077-6084.

Fawcett et al., "Rapid, Metal-Free Room Temperature Vulcanization Produces Silicone Elastomers" J. Polym. Sci. A Polym. Chem., 2013, vol. 51, pp. 644-652.

Grande, "Testing the functional tolerance of the Piers-Rubinsztajin reaction: a new strategy for functional silicones", Chem. Comm., 2010, pp. 4988-4990, vol. 46.

Herzberger et al., "Polymerization of Ethylene Oxide, Propylene Oxide, and Other Alkylene Oxides: Synthesis, Novel Polymer Architectures, and Bioconjugation" Chemical Reviews, American Chemical Society, 2016, pp. 2170-2243.

Lambert et al., "A Stable B-Silyl Carbocation", J. Am. Chem. Soc., 1996, vol. 118, pp. 7867-7868.

Lambert et al., "B-Silyl and B-Germyl Carbocations Stable at Room Temperature", J. Org. Chem., 1999, vol. 64, pp. 2729-2736.

Matsumoto et al., "One-Pot Sequence-Controlled Synthesis of Oligosiloxanes" Angew. Chem. Int. Ed. 2018, vol. 57, pp. 4637-4641.

Mitsuo, "NewHorizon of Organosilicon Chemistry", Dalt. Trans., 2010, pp. 9369-9378, vol. 39.

Oertle et al., "Hydrosilylation of tetrasubstituted Olefins" Tetrahedron Lett., 1985, vol. 26, pp. 5511-5514.

Perez et al., "Olefin Isomerization and Hydrosilylation Catalysis by Lewis Acidic Organofluorophosphonium Salts" J. Am. Chem. Soc., 2013, 135, 18308.

Piers et al., "Mechanistic Aspects of Bond Activation with Perfluoroarylboranes", Inorg. Chem., 2011, vol. 50, pp. 12252-12262.

Rubin et al., "Highly Efficient B(C6F5)3-Catalyzed Hydrosilylation of Olefins" J. Org. Chem, 2020, vol. 67, pp. 1936-1940.

Simonneau et al., "3-Silylated Cyclohexa-1,4-dienes as Precursors for Gaseous; Hydrosilanes: The B(C6F5)3-Catalyzed Transfer Hydrosilylation of; Alkenes" Angew. Chem. Int. Ed., 2013, vol. 52, pp. 11905-11907.

Song et al., "Lewis Acid-Catalyzed Regio- and Stereoselective Hyddrosiylation of Alkenes with Trialkylsilanes" Organometallics, 1999, vol. 18, pp. 3109-3115.

Yamamoto et al., "Sterochemistry of Aluminum Chloride Catalyzed Hydrosilylation of Methylcyclohexenes" Synlett, 1990, pp. 259-260.

Zhao et al., "N-Heterocyclic Carbene-Catalysed Hydrosilylation of Styryl and Propargylic Alcohols with Dihydrosilanes" Chem. Eur. J., 2011, vol. 17, pp. 9911-9914.

Berkefeld, "Tandem Frustrated Lewis Pair/Trisborane-Catalyzed Deoxygenative Hydrosilylation of Carbon Dioxide", JACS, 2010, pp. 10060-10661, vol. 132.

Brook, "New Control Over Silicone Synthesis using SiH Chemistry: The Piers-Rubinsztajn Reaction", Chem. Eur. J., 2018, pp. 8458-8469, vol. 24.

Cella, "Preparation of Polyaryloxysilanes and Polyaryloxysiloxanes by B(C6F5)3 Catalyzed Polyetherification of Dihydrosilanes and Bis-Phenols", Macromolecules, 2008, pp. 6965-6971, vol. 41.

Chojnowski, "Hydride Tranfer Ring-Opening Polymerization of a Cyclic Oligomethylhydrosiloxane. Route to a Polymer of Closed Multicyclic Structure", Macromolecules, 2012, pp. 2654-2661, vol. 45.

Chojnowski, "Oligomerization of Hydrosiloxanes in the Presence of Trisborane", Macromolecules, 2006, pp. 3802-3807, vol. 39.

Fuchise, "B(C6F5)3-Catalyzed Group Transfer Polymerization of n-Butyl Acrylate with Hydrosilane through In Situ Formation of Initiator by 1,4-Hydrosilylation of n-Butyl Acrylate", ACS Macro Lett., 2014, pp. 1015-1019, vol. 3.

Hoque, "Polysiloxanes with Periodically Distrubuted Isomeric Double-Decker Silsesquioxane in the Main Chain", Macromolecules, 2009, pp. 3309-3315, vol. 42.

Khalimon et al., ""A Photo Lewis Acid Generator (PhLAG): Controlled Photorelease of B(C6F5)3"", JACS, 2012, pp. 9601-9604, vol. 134.

Khalimon, "Photo Lewis acid generators: photorelease of B(C6F5)3 and applications to catalysis", Dalt. Trans., 2015, pp. 18196-18206, vol. 44.

Kim, "Metal-Free Hydrosilylation Polymerization by Borane Catalyst", Angew. Chem. Int. Ed, 2015, pp. 14805-14809, vol. 54.

Momming, "Reversible Metal-Free Carbon Dioxide Binding by Frustrated Lewis Paris", Angew. Chem. Int. Ed., 2009, pp. 6643-6646, vol. 48.

Oestreich, "A unified survey of Si—H and H—H bond activation catalysed by electron-deficient boranes", Chem. Soc. Rev., 2015, pp. 2202-2220, vol. 44.

Stephan, "Frustrated Lewis Pair Chemistry: Development and Perspectives", Angew. Chem. Int. Ed., 2015, pp. 6400-6441, vol. 54.

Stephan, "Frustrated Lewis Pairs", JACS, 2015, pp. 10018-10032, vol. 137.

Zhang, "Piers' borane-mediated hydrosilylation of epoxides and cyclic ethers", Chem. Commun., 2018, pp. 7243-7246, vol. 54.

* cited by examiner

THERMALLY INITIATED ACID CATALYZED REACTION BETWEEN SILYL HYDRIDE AND SILYL ETHER AND/OR SILANOL

CROSS REFERENCE TO RELATED APPLICATIONS

This application is a U.S. national stage filing under 35 U.S.C. § 371 of PCT Application No. PCT/US2020/035639 filed on 2 Jun. 2020, which claims the benefit of U.S. Provisional Patent Application No. 62/856,776 filed 4 Jun. 2019 under 35 U.S.C. § 119 (e). PCT Application No. PCT/US2020/035639 and U.S. Provisional Patent Application No. 62/856,776 are hereby incorporated by reference.

BACKGROUND OF THE INVENTION

Field of the Invention

The present invention relates to a composition comprising a silyl hydride, silyl ether and/or silanols, Lewis acid catalyst and amine blocking agent for the Lewis acid catalyst. Heating the composition releases the Lewis acid catalyst from the amine blocking agent and allows it to trigger reaction between the silyl hydride and silyl ether and/or silanols.

Introduction

Strong Lewis acids are known catalysts for numerous reactions. For instance, the Piers-Rubinsztajn (PR) reaction between silyl hydride and silyl ether is a well-known reaction catalyzed by a strong Lewis acid, particularly tris (pentafluorophenyl) borane ("BCF"). Similar Lewis acid catalyzed reactions include rearrangement reactions between silyl hydride and polysiloxane as well as silyl hydride and silanols. See, for instance Chem. Eur. J. 2018, 24, 8458-8469.

Lewis acid catalyzed reactions, such as the PR reaction, tend to be rapid reactions even at 23 degrees Celsius (° C.). The high reactivity of these reaction systems limits their applications. The reactions may be desirable in applications such as coatings and adhesives; however, the systems must be stored in a multiple-part system in order to preclude reaction prior to application. Even so, the reaction can occur so quickly once the components are combined that there is little time to apply the reactive system. It is desirably to identify a way to control the Lewis acid catalyzed reactions and, ideally, provide them as one-part systems comprising reactants and Lewis acid catalyst in a form that is stable at 23° C. but that can be triggered to react when desired.

Ultraviolet (UV) light sensitive blocking agents have been combined with Lewis acids in order to form blocked Lewis acids that release Lewis acid upon exposure to UV light. Upon exposure to UV light the blocking agent dissociates from the Lewis acid leaving the Lewis acid free to catalyze a reaction. A challenge with systems comprising these blocked Lewis acids is that they need to be kept in the dark in order to maintain stability. Moreover, they need to be exposed to UV light in order to initiate reaction—and for thick compositions it can be difficult to obtain UV light penetration to initiate cure quickly throughout the composition.

Notably, amines have been looked at in combination with Lewis acids in PR reaction type systems. However, amines are reported to completely suppress the reaction. See, for instance, Chem. Comm. 2010, 46, 4988-4990 at 4988. It was later identified that most amines complex essentially irreversibly with the Lewis acid catalysts, yet triaryl amines were found to be an exception and do not compromise Lewis acids in catalyzing PR reactions. See, Chem. Eur. J. 2018, 24, 8458-8469 at 8461 and 8463.

It is desirable to identify a way to prepare a one-part system for a Lewis-acid catalyzed reaction that is stable at 23° C. even when exposed to UV light, but that can be triggered to react when desired.

BRIEF SUMMARY OF THE INVENTION

The present invention provides a solution to the problem of identifying a way to prepare a one-part system for a Lewis-acid catalyzed reaction that is stable at 23° C. even when exposed to UV light, but that can be triggered to react when desired. In particular, the present invention provides a solution to such a problem in a reaction between silyl hydride and silanols and/or silyl ethers. Yet more, the present invention provides such a solution that is triggered to react when heated so as to have a desirable 90° C. Cure Speed, that is a 90° C. Cure Speed of 15 minutes or less, preferably 10 minutes or less, more preferably 5 minutes or less, even more preferably one minute or less and most preferably 30 seconds or less.

The present invention is a result of surprisingly and unexpectedly discovering specific amines that complex with a Lewis acid catalyst and block the activity of the Lewis acid catalyst at 23° C. to form a stable one-part reactive system but release the Lewis acid catalyst when heated so as to facility rapid cure of the one-part reactive system. As a result, the specific amines are thermally triggerable blocking agents for the Lewis acid catalyst that block a Lewis acid catalyst at 23° C. yet release the Lewis acid catalyst to catalyze reactions at elevated temperatures such as 80° C. or higher, 90° C. or higher, or 100° C. or higher (and generally 300° C. or lower, 250° C. or lower, 200° C. or lower, 150° C. or lower and even 100° C. or lower). This is surprising in view of previous understanding in the art. As noted above, current understanding is that amines either irreversibly complex with Lewis acid catalysts or fail to compromise Lewis acid catalysts in Lewis acid catalyzed reactions. See, Chem. Comm. 2010, 46, 4988-4990 at 4988 and Chem. Eur. J. 2018, 24, 8458-8469 at 8461 and 8463.

The present discovery of amines that work as thermally triggered blocking agents for Lewis acid catalysts enables the present inventive composition which serve as one-component reactive systems comprising a Lewis acid catalyst, silyl hydride and silanols and/or silyl ethers along with the amine blocking agent that are stable at 23° C. but react upon heating.

In a first aspect, the present invention is a composition comprising a mixture of silyl hydride, a silanol and/or silyl ether, a Lewis acid catalyst and an amine having the following formula: $R^1R^2R^3N$; wherein where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon.

In a second aspect, the present invention is a process comprising the steps of: (a) providing a composition of the first aspect; and (b) heating the composition to a temperature sufficient to dissociate the Lewis acid catalyst from the amine.

Compositions of the present invention are suitable, for example, as one-component systems for coatings and adhesives.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standardization.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

The composition of the present invention comprises a mixture of silanol and/or silyl ether, silyl hydride, a Lewis acid and an amine. The composition is useful as a one-part reactive system that is stable at 23° C. yet cures when heated.

"Silanols" are molecules that contain a silicon-hydroxyl ("Si—OH") bond and can contain multiple Si—OH bonds.

"Silyl ethers" are molecules that contain a silicon-oxygen-carbon ("Si—O—C") bond and can contain multiple Si—O—C bonds.

"Silyl hydrides" are molecules that contain a silicon-hydrogen (Si—H) bond and can contain multiple Si—H bonds.

"Alkyl" is a hydrocarbon radical derived from an alkane by removal of a hydrogen atom. "Substituted alkyl" is an alkyl that has an atom, or chemical moiety, other than carbon and hydrogen in place of at least one carbon or hydrogen.

"Aryl" is a radical derived from an aromatic hydrocarbon by removal of a hydrogen atom. "Substituted aryl" is an aryl that has an atom, or chemical moiety, other than carbon and hydrogen in place of at least one carbon or hydrogen.

"Conjugated" refers to a set of alternating carbon-carbon single and double and/or triple bonds whose p-orbitals are connected allowing for delocalized electrons across the carbon bonds. "Conjugated carbon" refers to a carbon in the set of alternating carbon-carbon single and double bonds that are conjugated. "Non-conjugated" refers to a carbon that is not part of a conjugated system. "Aromatic" refers to a cyclic planar conjugated molecule.

"Blocking agent" is a component that binds to a second component in order to prevent activity of the second component in some way. For example, a blocking agent on a catalyst precludes the catalyst from catalytic activity while complexed with the blocking agent.

Lewis acids catalyze a reaction between silyl hydrides and silanols as generally shown below:

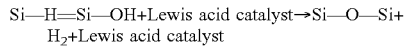
Si—H═Si—OH+Lewis acid catalyst→Si—O—Si+ $H_2$+Lewis acid catalyst

Lewis acid also catalyze a reaction between silyl hydrides and silyl ether as shown generally below:

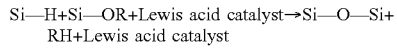
Si—H+Si—OR+Lewis acid catalyst→Si—O—Si+ RH+Lewis acid catalyst where R is an alkyl, substituted alkyl, aryl or substituted aryl provided it has a carbon attached to the oxygen shown.

The present invention includes a composition comprising a mixture of silyl hydride, a silyl ether and/or silanol, a Lewis acid catalyst and a particular amine. It has been discovered that the particular amines of the present invention act as blocking agents for the Lewis acid catalyst at 23° C., but release the Lewis acid catalyst at elevated temperatures (for example, 80° C. or higher or 90° C. or higher). As a result, the compositions of the present invention are stable at 23° C. but are thermally triggered to undergo Lewis acid catalyzed reaction at elevated temperatures. Such a composition achieves an objective of the present invention to provide a "stable" one-part reactive system for a Lewis acid catalyzed reaction that is "stable" at 23° C. "Stable" at 23° C. means that the reactive system does not gel at 23° C. in one hour or less, preferably in 3 hours or less, more preferably in 6 hours or less, even more preferably in 12 hours or less and even more preferably in 24 hours or less. Evaluate shelf stability using the "23° C. Stability Test" in the Examples section, below. The compositions of the present invention further provide a one-part reactive system for a Lewis acid catalyze reaction that, while stable at 23° C., is triggered when desired by heating. In particular, compositions of the present invention cure at 90° C. in 30 minutes or less, preferably in 10 minutes or less, more preferably in 5 minutes or less and even more preferably in one minute or less. Determine rate of curing at 90° C. using the "Cure Speed at 90° C." test in the Example section, below.

Silanol/Silyl Ether

The present invention can comprise silanol without any silyl ether, silyl ether without any silanol or can comprise both silanol and silyl ether. When the composition comprises both silanol and silyl ether the silanol can be a different molecule than the silyl ether or the silanol and silyl ether can be the same molecule with both Si—OH and Si—O—C bonds. Silanols and silyl ethers for use in the present invention can be linear, branched or a combination of linear and branched molecules. Branched molecules contain three or four "branches" off from a single "branch" or "backbone" atom. A "branch" contains two atoms bonded together. Hence, a branched molecule contains one atom (a "backbone" atom) that has bonded to it three or four atoms (first branch atoms) that each have yet another atom (second branch atoms) bonded to it to. Branches can extend any number of atoms beyond two.

Preferably, branches in a branched molecule contain three or more, four or more, five or more, six or more, seven or more, eight or more, nine or more and even 10 or more atoms. At the same time, while there is technically no upper limit to the length of branches in a branched atom, branched silanols and silyl ethers for use in the present invention typically have 10,000 or fewer, preferably 5,000 or fewer, 1,000 or fewer, 500 or fewer and can have 100 or fewer, 50 or fewer, 30 or fewer, 20 or fewer, and even 10 or fewer atoms in each branch.

Silanols of the present invention have a Si—OH bond. The silanol can have one or more than one Si—OH bond. It is expected that silanols of any kind are suitable. The silanol can be a hydroxylated silane or a hydroxylated siloxane. The silanol can be a siloxane with a degree of polymerization (DP) of 10 or more, preferably 20 or more, more preferably 30 or more, and can be 40 or more 50 or more, 75 or more, 100 or more, 250 or more, 500 or more, 1000 or more, 2,000 or more, 4,000 or more, 6,000 or more and even 8,000 or more while at the same time is typically 10,00 or less, preferably 8,000 or less, 6,000 or less, 4,000 or less, 2,000 or less, 1,000 or less, 800 or less, 600 or less, 400 or less, 200 or less or even 100 or less. DP corresponds to the number of siloxy (Si—O containing) groups there are in the molecule and can be determined by silicon-29 nuclear magnetic resonance ($^{29}$Si NMR) spectroscopy.

Silyl ethers of the present invention can have one or more than one Si—O—C bond. Generally, any silyl ether is expected to be suitable. Typically, the silyl ether will have a degree of polymerization (DP) of 10 or more, preferably 20 or more, more preferably 30 or more, and can be 40 or more 50 or more, 75 or more, 100 or more, 250 or more, 500 or more, 1000 or more, 2,000 or more, 4,000 or more, 6,000 or more and even 8,000 or more while at the same time is typically 10,00 or less, preferably 8,000 or less, 6,000 or less, 4,000 or less, 2,000 or less, 1,000 or less, 800 or less, 600 or less, 400 or less, 200 or less or even 100 or less. DP corresponds to the number of siloxy (Si—O containing) groups there are in the molecule and can be determined by silicon-29 nuclear magnetic resonance ($^{29}$Si NMR) spectroscopy. The silanol and/or silyl ether of the present invention can be polymeric. Desirably, the silanol and/or silyl ether is a polysiloxane molecule with one or more than one Si—OH and/or Si—O—C bond. The polysiloxane can be linear and comprise only M ($\equiv$Si$_{1/2}$) type and D ($=$SiO$_{2/2}$) type units. Alternatively, the polysiloxane can be branched and contain T (—SiO$_{3/2}$) and/or Q (SiO$_{4/2}$) type units. Typically, M, D, T and Q units have methyl groups attached to the silicon atoms where oxygen is not attached to provide a valence of four to each silicon and each oxygen is attached to the silicon of another unit. Referring to these as M, D, T and Q "type" units means that groups such as those selected from a group consisting of hydrogen, alkyl, substituted alkyl, aryl, and substituted aryl groups can be bound to the silicon atoms in place of one or more methyl.

Examples of suitable silanols include those commercially available from the Dow Chemical Company as XIAMETER™ PMX-0156 silanol fluid, XIAMETER™ PMX-0930 silanol fluid and DOWSIL™ DS polymer, DOWSIL™ RSN-217 Flake Resin, DOWSIL™ RSN-233 Flake Resin as well as those commercially available from Gelest as am-hydroxyl-terminated poly(dimethylsiloxane), DMS-S12 (550 g/mol, 16-32 cSt), DMS-S14 (1270 g/mol, 35-45 cSt), DMS-S31 (21,600 g/mol, 1000 cSt) and am-hydride-terminated polyphenylmethyl siloxane (PMS-HO3, 340 g/mol, 2-5 cSt). XIAMETER is a trademark of Dow Corning Corporation. DOWSIL is a trademark of The Dow Chemical Company.

Examples of suitable silyl ethers include those commercially available from The Dow Chemical Company under the following trade names: XIAMETER™ OFS-6070 silane, XIAMETER™ OFS-6011 silane, XIAMETER™ OFS-6020 silane, XIAMETER™ OFS-6030 silane, DOWSIL™ Z-6062 silane, DOWSIL™ Z-6300 silane, DOWSIL™ Z-6341 Silane, XIAMETER™ OFS-6040 silane, DOWSIL™ Z-6023 silane, DOWSIL™ Z-6015 silane, XIAMETER™ OFS-6920 silane, XIAMETER™ OFS-6690 silane and XIAMETER™ OFS-6076 silane, DOWSIL™ 3074 Intermediate and DOWSIL™ 3037 Intermediate. XIAMETER is a trademark of Dow Corning Corporation. DOWSIL is a trademark of The Dow Chemical Company.

Typically, the combined concentration of silanol and silyl ether in the composition is 70 weight-percent (wt %) or more, 75 wt % or more, 80 wt % or more, 85 wt % or more, even 90 wt % or more while at the same time is typically 90 wt % or less, 85 wt % or less, 80 wt % or less, or even 75 wt % or less based on combined weight of silyl hydride, silanol, silyl ether, amine and Lewis acid catalyst in the composition.

Silyl Hydride

The silyl hydride contains one, preferably more than one, Si—H bond. The Si—H bond is typically part of polysilane (molecule containing multiple Si—H bonds) or polysiloxane. Silyl hydrides containing multiple Si—H bonds are desirable as crosslinkers in compositions of the present invention because they are capable of reacting with multiple silanol and/or silyl ether groups.

The silyl hydride can be the same or can be a different molecule from the silanol and/or silyl ether. That is, if the composition comprises a silanol then the silanol can also contain a Si—H bond and serve as both the silanol and the silyl hydride components of the composition.

Similarly, if the composition comprises a silyl ether then the silyl ether can also contain a Si—H bond and serve as both the silyl ether and the silyl hydride components of the composition. Alternatively, the silyl hydride component can be a different molecule than the silanol and/or silyl ether that is also in the composition. The silanol and/or silyl ether can be free of Si—H bonds.

The silyl hydride of the present invention can be polymeric. The silyl hydride can be linear, branched or can contain a combination of linear and branched silyl hydrides. The silyl hydride can be a polysilane, a polysiloxane or a combination of polysilane and polysiloxanes.

Desirably, the silyl hydride is a polysiloxane molecule with one or more than one Si—H bond. The polysiloxane can be linear and comprise only M type and D type units. Alternatively, the polysiloxane can be branched and contain T type and/or Q type units.

Examples of suitable silyl hydrides include pentamethyldisiloxane, bis(trimethylsiloxy)methyl-silane, tetramethyldisiloxane, tetramethycyclotetrasiloxane, and hydride terminated poly(dimethylsiloxane) such as those available from Gelest under the tradenames: DMS-H03, DMS-H25, DMS-H31, and DMS-H41.

The concentration of silyl hydride is typically sufficient to provide a molar ratio of Si—H groups to the combination of silanol and silyl ether groups that is 0.2 or more, 0.5 or more, 0.7 or more, 0.8 or more, 0.9 or more, 1.0 or more 1.2 or more, 1.4 or more, 1.6 or more, 1.8 or more, 2.0 or more, 2.2 or more, even 2.5 or more while at the same time is typically 5.0 or less, 4.5 or less, 4.0 or less, 3.5 or less, 3.0 or less, 2.8 or less, 2.5 or less, 2.3 or less, 2.0 or less, 1.8 or less, 1.6 or less, 1.4 or less, 1.2 or less or even 1.0 or less.

Either the silanol/silyl ether or the silyl hydride (or both) can serve as crosslinkers in the reaction. A crosslinker has at least two reactive groups per molecule and reacts with two different molecules through those reactive groups to cross link those molecules together. Increasing the linear length between reactive groups in a crosslinker tends to increase the flexibility in the resulting crosslinked product. In contrast, shortening the linear length between reactive groups in a crosslinker tends to reduce the flexibility of a resulting crosslinked product. Generally, to achieve a more flexible crosslinked product a linear crosslinker is desired and the length between reactive sites is selected to achieve desired flexibility. To achieve a less flexible crosslinked product, shorter linear crosslinkers or even branched crosslinkers are desirable to reduce flexibility between crosslinked molecules.

Typically, the concentration of silyl hydride in the composition is 5 wt % or more, 10 wt % or more, 15 wt % or more, 20 wt % or more, even 25 wt % or more while at the same time is typically 30 wt % or less, 25 wt % or less, 20 wt % or less, 15 wt % or less or even 5 wt % or less based on combined weight of silyl hydride, silanol, silyl ether, amine and Lewis acid catalyst in the composition.

Lewis Acid Catalyst

The Lewis acid catalyst is desirably selected from a group consisting of aluminum alkyls, aluminum aryls, aryl boranes, aryl boranes including triaryl borane (including substituted aryl and triaryl boranes such a tris(pentafluorophenyl)borane), boron halides, aluminum halides, gallium alkyls, gallium aryls, gallium halides, silylium cations and phosphonium cations. Examples of suitable aluminum alkyls include trimethylaluminum and triethylaluminum. Examples of suitable aluminum aryls include triphenyl aluminum and tris-pentafluorophenyl aluminum. Examples of triaryl boranes include those having the following formula:

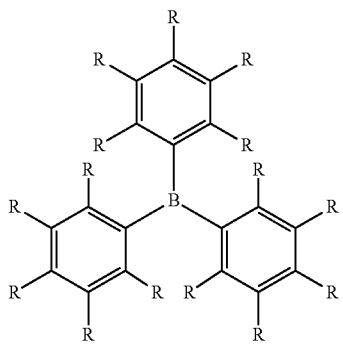

where R is independently in each occurrence selected from H, F, Cl and $CF_3$. Examples of suitable boron halides include $(CH_3CH_2)_2BCl$ and boron trifluoride. Examples of suitable aluminum halides include aluminum trichloride. Examples of suitable gallium alkyls include trimethyl gallium. Examples of suitable gallium aryls include tetraphenyl gallium. Examples of suitable gallium halides include trichlorogallium. Examples of suitable silylium cations include $(CH_3CH_2)_3Si^+X^-$ and $Ph_3Si^+X^-$. Examples of suitable phosphonium cations include $F-P(C_6F_5)_3^+X^-$.

The Lewis acid is typically present in the composition at a concentration of 10 weight parts per million (ppm) or more, 50 ppm or more, 150 ppm or more, 200 ppm or more, 250 ppm or more, 300 ppm or more, 350 ppm or more 400 ppm or more, 450 ppm or more, 500 ppm or more, 550 ppm or more, 600 ppm or more, 70 ppm or more 750 ppm or more, 1000 ppm or more 1500 ppm or more, 2000 ppm or more, 4000 ppm or more, 5000 ppm or more, even 7500 ppm or more, while at the same time is typically 10,000 or less, 7500 ppm or less, 5000 ppm or less, 1500 pm or less, 1000 ppm or less, or 750 ppm or less relative to combined weight of silyl hydride, silanol and silyl ether in the composition.

Amine

The selection of amine is important because it must complex with the Lewis acid at 23° C. to inhibit catalytic activity of the Lewis acid in a reaction composition at that temperature, yet must release the Lewis acid at an elevated temperature so as to rapidly (within 10 minutes or less, preferably 5 minutes or less, more preferably one minute less) gel the reaction composition at 90° C. Reaction compositions can be monitored at 23° C. and 90° C. to determine gel times (see Example section below). Alternatively, or additionally, one can characterize by differential scanning calorimetry the temperature at which the curing reaction exotherm occurs (Tpeak, see Example section below for procedure). The Tpeak value for a composition should increase relative to the Tpeak for an identical amine-free composition if the proper amine is present, but desirably remains below 130° C., preferably below 120° C., more preferably below 110° C. so as to reflect dissociation sufficient to rapidly cure at 90° C.

Amines have been reported as irreversibly complexing with Lewis acid catalysts, except for triaryl amines which are reported to not compromise Lewis acid catalysts. Without being bound by theory, it seems the present invention is partly the result of discovering that by having one or more conjugated moeity attached the nitrogen of an amine through a conjugated carbon, the conjugated moiety helps delocalize the free electrons of the amine and weaken it as a Lewis base. As a result, amines having at least one conjugated moiety attached to the nitrogen of the amine through a conjugated carbon have been discovered to complex with and block Lewis acid catalyst at 23° C. so as preclude gelling of a reaction composition at 23° C. in 4 hours or less, preferably 8 hours or less, more preferably 10 hours or less, yet more preferably 12 hours less, while at the same time complexes weakly enough so as to release the Lewis acid catalyst upon heating to 90° C. so as to gel the composition in 10 minutes or less, preferably 5 minutes or less, more preferably one minute or less.

To be a sufficiently weak Lewis base, the amines of the present invention have at least one, preferably at least two, and can have three conjugated moieties attached to the nitrogen of the amine through a conjugated carbon so that the free electron pair on the nitrogen can dissociate with the conjugated moiety and weaken the amine as a Lewis base. Preferably, the conjugated moieties are aromatic moieties.

Triaryl amines have three aromatic conjugated moieties attached to the amine nitrogen each through a conjugated carbon. As a result, triaryl amines are examples of amines that optimally delocalize the nitrogen free electrons to create a weak Lewis base. That is consistent with prior art reporting that triaryl amines do not compromise Lewis acid catalysts. Nonetheless, triaryl amines have been surprisingly discovered to have a blocking effect on Lewis acid catalysts at 23° C. and inhibit Lewis acid catalyzed reaction at 23° C. and are in scope of the broadest scope of the amines suitable for use in the present invention. Desirably, the amines of the present invention are stronger Lewis bases than triaryl amines in order to achieve greater blocking effect (hence, longer shelf stability) at 23° C. In that regard, while the amine of the present invention can have one, two or three conjugated moieties attached to the nitrogen of the amine through a conjugated carbon, it is desirable that the amine is other than a triaryl amine. Compositions of the present invention can be free of triarylamines.

The ability of a conjugated moiety to weaken the strength of the amine as a Lewis base is further tunable with substituent groups that can be attached to the conjugated moiety. Including electron withdrawing groups (such as halogens) on the conjugated moiety will further draw the nitrogen electrons into the delocalized conjugated system and weaken the strength of the amine as a Lewis base. Including electron donating groups on the conjugated moiety has the opposite effect and increases the resulting amine strength as a Lewis base relative to the same amine with the conjugated moiety without the electron donating group(s).

The amine needs to be strong enough to bind to and block the Lewis acid catalyst at 23° C. in order to achieve shelf stability. The amine will release the acid at lower temperatures if it is a weaker Lewis base than if it were a stronger Lewis base. Hence, selection of the moieties attached to the nitrogen of the amine can be selected to achieve shelf stability and reactivity at a desired temperature.

It has further been discovered that suitable amines must have the amine nitrogen that is not a member of an N=C—N linkage such as in amidines, guanidines and N-methylimidazole. Desirably, the composition is free of amines having an N=C—N linkage. For example, the composition can be free of amidines and guanidines.

In general, the amine has the following formula: $R^1R^2R^3N$; where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon. One, two or three of $R^1$, $R^2$ and $R^3$ can be a conjugated moiety connected to the nitrogen by a conjugated carbon. Desirably, the conjugated moiety is an aromatic moiety.

Examples of suitable amines for use in the present invention include any one or any combination of more than one amine selected from a group consisting of: aniline, 4-methylaniline, 4-fluoroaniline, 2-chloro-4-fluoroaniline, diphenylamine, diphenylmethylamine, triphenylamine, 1-naphthylamine, 2-naphthylamine, 1-aminoanthracene, 2-aminoanthracene, 9-aminoanthracene, β-aminostyrene, 1,3,5-hexatrien-1-amine, N,N-dimethyl-1,3,5-hexatrien-1-amine, 3-amino-2-propenal and 4-amino-3-buten-2-one.

The concentration of amine in the composition is at least at a molar equivalent to the concentration of Lewis acid catalyst so as to be able to complex with and block all of the Lewis acid catalyst at 23° C. The concentration of amine can exceed the molar concentration of Lewis acid catalyst, but preferably is present at a concentration of 110 mole-percent (mol %) or less, prefer 105 mol % or less, more preferably 103 mol % or less and most preferably 101 mol % or less while also being present at 100 mol % or more relative to total moles of Lewis acid catalyst.

The amine and Lewis acid form a complex in the composition that blocks the Lewis acid from catalyzing a reaction between the other composition components sufficiently to be shelf stable at 23° C. Upon heating, the amine releases the Lewis acid to allow the Lewis acid to catalyze a reaction.

Optional Components

Compositions of the present invention can consist of the silyl hydride, the alpha-beta unsaturated ester, the Lewis acid catalyst and the amine. Alternatively, the compositions of the present invention can further comprise one or a combination of more than one optional component. Optional components are desirably present at a concentration of 50 wt % or less, 40 wt % or less, 30 wt % or less, 20 wt % or less, 10 wt % or less, 5 wt % or less, or even one wt % or less based on composition weight.

Examples of possible optional components include one or a combination of more than one component selected from a group consisting of hydrocarbyl solvents (typically at a concentration of 10 wt % or less, 5 wt % or less, even one wt % or less based on composition weight), pigments such as carbon black or titanium dioxide, fillers such as metal oxides including SiO2 (typically at a concentration of 50 wt % or less based on composition weight), moisture scavengers, fluorescent brighteners, stabilizers (such as antioxidants and ultraviolet stabilizers), and corrosion inhibitors. The compositions of the present invention also can be free of any one or any combination of more than one such additional components.

Notably, the composition of the present invention can contain one wt % or less, 0.5 wt % or less water relative to composition weight. Desirably, the composition is free of water.

Reaction Process

The present invention includes a chemical reaction process comprising the steps of: (a) providing a composition of the present invention; and (b) heating the composition to a temperature sufficient to dissociate the Lewis acid catalyst from the amine.

Step (a) can comprise mixing together an amine, Lewis acid catalyst, a silyl hydride and a silanols and/or silyl ether. However, the Lewis acid catalyst and amine are combined so that the amine can complex with and block the catalytic activity of the Lewis acid prior to combining them with both of silyl hydride and silanol and/or silyl ether. It is possible to prepare the Lewis acid/amine complex in the presence of one of the reactants (that is, the silyl hydride or the silanol and/or silyl ether) provided the Lewis acid does not catalyze reaction with the one reactant. The amine and Lewis acid can be combined in a solvent, such as toluene, to form the blocked Lewis acid complex and then that complex can be combined with the silyl hydride and silanol and/or silyl ether.

Step (b) generally requires heating the composition to a temperature of 80° C. or higher, preferably 90° C. or higher while at the same time generally can be accomplished by heating to a temperature of 300° C. or lower, 250° C. or lower, 200° C. or lower, 150° C. or lower, and can be 100° C. or lower.

The compositions of the present invention are particular useful as coatings. The compositions can also be useful form forming molded articles. In such an applications the process of the present invention can further comprise applying the composition to a substrate after step (a) and before or during step (b).

EXAMPLES

The following Examples (Exs) and Comparative Examples (Comp Exs) are made according to the following procedures using the amine blocking agent identified in Table 1. Table 1 also identifies the Shelf Life and Cure Speed at 90° C. for the Exs and Comp Exs. Shelf Life and Cure Speed test methods are set forth below. Methods for making the silyl hydride, silanols, and catalyst solution following the Comp Ex and Ex Preparation procedure below.

Ex and Comp Ex Preparation. Combine 90 weight-percent (wt %) $MD^H{}_{65}M$ Silyl Hydride with 10 wt % $M^{OH}D_5M^{OH}$ silanol in a dental cup and mix with a SpeedMixer to form a reactant mixture, with wt % relative to reactant mixture weight. In a separate container prepare a Catalyst Solution (see below). Add enough Catalyst Solution to the reactant mixture to provide 500 weight parts Lewis acid catalyst per million weight parts of reactant mixture and mix the resulting composition to form the Ex or Comp Ex. Characterize the 23° C. Shelf Life and Cure Speed at 90° C.

$MD^H{}_{65}M$ Silyl Hydride. Fit a 3-necked flask with a mechanical stirrer and add 40 grams (g) deionized water, 10 g heptane and 0.05 g tosylic acid. Add to this dropwise while stirring a mixture of 200 g methyldichlorosilane and 10 g trimethylchlorosilane over 30 minutes. Stir for an additional 60 minutes at 23° C. Wash the reaction solution three times with 50 milliliters (mL) deionized water each time. Dry the solution with anhydrous sodium sulfate and filter through activated carbon. Remove volatiles by Rotovap to obtain $MD^H{}_{65}M$ Silyl Hydride.

$M^{OH}D_5M^{OH}$ Silanol. This material is commercially available as DMS-S12 from Gelest.

Catalyst Solution.

For Ex 1, add 1.256 g of a solution of 5 wt % 4-methylaniline in toluene into 6 g solution of 5 wt % BCF in toluene in a 20 mL vial (the mole ratio of [4-methylaniline]/[BCF]=1:1). Sonicate for 30 seconds at 23° C. The solution contains 4.12 wt % BCF and is used as the catalyst solution in preparing Ex 1.

For the remaining compositions, a total 12 gram mixture solution was prepared by adding a solution of 5 wt % aniline in toluene into a solution of 5 wt % BCF in toluene in a 20 mL vial, comprising a 1:1 ratio of [amine]/[BCF], followed by sonicating for 30 seconds and then keeping still in hood overnight. 0.5 to 1 gram tetrahydrofuran was added into the solution to help dissolve the formed BCF-Aniline complex. The as prepared clear solution is the catalyst solution for Compositions other than Ex 1.

23° C. Stability Test. Prepare the composition in a vial and then seal the vial and store at 23° C. Check the flowability of the contents of the vial at by inverting the vials and watching the contents to determine if it flows. Check flowability on hour intervals for 8 hours and after than on 24 hour intervals. Record the time at which gelation occurs as evidenced by a failure of the vial contents to flow in 1-2 seconds upon inverting. The time at which gelation occurs is the "23° C. Shelf Life". During the test, the composition are open to ambient (including ultraviolet) light.

Cure Speed at 90° C. The Cure Speed at 90° C. is the time it takes to form a gel or cured film free of a tacky surface at 90° C. Coat a 125 micrometer film of a composition on glassine paper substrate. Place the film in an oven at 90° C. Check the films for tackiness every 30 seconds. The time required to achieve a tack-free film is the Cure Speed at 90° C.

Tpeak. Tpeak is the temperature where there is maximum reaction exotherm in a reaction system. Determine Tpeak by differential scanning calorimetry (DSC) for a sample composition. Characterize by DSC by loading a 10 milligram sample of a composition into a DSC pan and conducting DSC using a temperature ramp from 10° C. to 250° C. at a rate of 10° C. per minute. Tpeak is the temperature at which maximum exotherm is evident in the DSC curve.

TABLE 1

| Composition | Amine Blocking Agent | Tpeak (° C.) | 23° C. Shelf Life | Cure Speed at 90° C. |
|---|---|---|---|---|
| Comp Ex A | -NONE- | NA | 0* | N/A |
| Comp Ex B | Butylamine | 184 | >5 days | >60 minutes |
| Comp Ex C | Diisopropylamine | 191 | >5 days | >60 minutes |
| Comp Ex D | Trimethylamine | 175 | >5 days | >60 minutes |
| Comp Ex E | N-methylimidazole | 157 | >5 days | >60 minutes |
| Ex 1 | 4-methylaniline | 94 | >4 days | 7 minutes |
| Ex 2 | Aniline | 83 | >4 days | 2 minutes |
| Ex 3 | 4-fluoroaniline | 77 | 6 hours | 1 minute |
| Ex 4 | 2-chloro-4-fluoroaniline | 67 | 3 hours | 30 seconds |
| Ex 5 | Diphenylamine | 63 | 3 hours | 1 minute |
| Ex 6 | Triphenylamine | 63 | 1.5 hours | 1 minute |

*Comp Ex A began gelling at 23° immediately upon formation as evidenced by formation of solids and bubbles. As a result, cure speed at 90° C. was not attempted.

The data in table 1 reveals that when BCF is used uninhibited the reactive system is not stable at 23° C., per Comp Ex A. Comp Exs B-E reveal that amines that do not have an aromatic carbon attached to the nitrogen (and/or have an N=C—N linkage) complex so strongly with the BCF that the compositions fail to cure even after 60 minutes at 90° C. However, Exs 1-6 reveal that when one or more conjugated carbon is attached to the nitrogen the amine complexes with the BCF long enough to provide reasonable 23° C. Shelf Life while also provide very rapid curing at 90° C.

Similar results are expected with compositions containing silyl ether instead of the silanols component.

What is claimed is:

1. A composition comprising a mixture of silyl hydride, a silanol and/or silyl ether, a Lewis acid catalyst and an amine having the following formula: $R^1R^2R^3N$; where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon.

2. The composition of claim 1, wherein the conjugated moiety is an aromatic moiety.

3. The composition of claim 1, wherein at least two of $R^1$, $R^2$, and $R^3$ are conjugated moieties attached to N through a conjugated carbon.

4. The composition of claim 1, wherein the Lewis acid catalyst is selected from a group consisting of aluminum alkyls, aluminum aryls, aryl boranes, fluorinated aryl borane, boron halides, aluminum halides, gallium alkyls, gallium aryls, gallium halides, silylium cations and phosphonium cations.

5. The composition of claim 4, wherein the Lewis acid catalyst is a fluorinated aryl borane.

6. The composition of claim 1, wherein the silyl hydride and the silanol and/or silyl ether are the same molecule.

7. The composition of claim 1, wherein the composition is free of a UV light sensitive blocking agent for the Lewis acid catalyst.

8. A process comprising the steps of:
 (a) providing a composition comprising a mixture of silyl hydride, a silanol and/or silyl ether, tris(pentafluorophenyl)borane and an amine selected from the group consisting aniline, 4-methylaniline, 4-fluoroaniline, 2-chloro-4-fluoroaniline, diphenylamine, triphenylamine; and
 (b) heating the composition to a temperature sufficient to dissociate the Lewis acid catalyst from the amine.

9. The process of claim 8, wherein step (a) comprises mixing together the amine, the tris(pentafluorophenyl)borane, the silyl hydride and the silanol and/or the silyl ether provided the tris(pentafluorophenyl)borane and the amine are combined so that the amine can complex with and block the catalytic activity of the tris(pentafluorophenyl)borane prior to combining them with both of the silyl hydride and the silanol and/or the silyl ether.

10. The process of claim 8, wherein the process further includes a step of applying the composition to a substrate or placing the composition in a mold after step (a) and before or during step (b).

11. The process of claim 9, wherein the process further includes a step of applying the composition to a substrate or placing the composition in a mold after step (a) and before or during step (b).

12. The composition of claim 2, wherein at least two of $R^1$, $R^2$, and $R^3$ are conjugated moieties attached to N through a conjugated carbon.

13. The composition of claim 2, wherein the silyl hydride and the silanol and/or silyl ether are the same molecule.

14. The composition of claim 3, wherein the silyl hydride and the silanol and/or silyl ether are the same molecule.

15. The composition of claim 4, wherein the silyl hydride and the silanol and/or silyl ether are the same molecule.

16. The composition of claim 5, wherein the silyl hydride and the silanol and/or silyl ether are the same molecule.

17. The composition of claim 2, wherein the composition is free of a UV light sensitive blocking agent for the Lewis acid catalyst.

18. The composition of claim 3, wherein the composition is free of a UV light sensitive blocking agent for the Lewis acid catalyst.

19. The composition of claim 4, wherein the composition is free of a UV light sensitive blocking agent for the Lewis acid catalyst.

20. The composition of claim 6, wherein the composition is free of a UV light sensitive blocking agent for the Lewis acid catalyst.

\* \* \* \* \*